Dec. 16, 1969     S. P. GOFORTH ET AL     3,484,104
AMUSEMENT RIDE DEVICE
Filed July 25, 1967     6 Sheets-Sheet 1
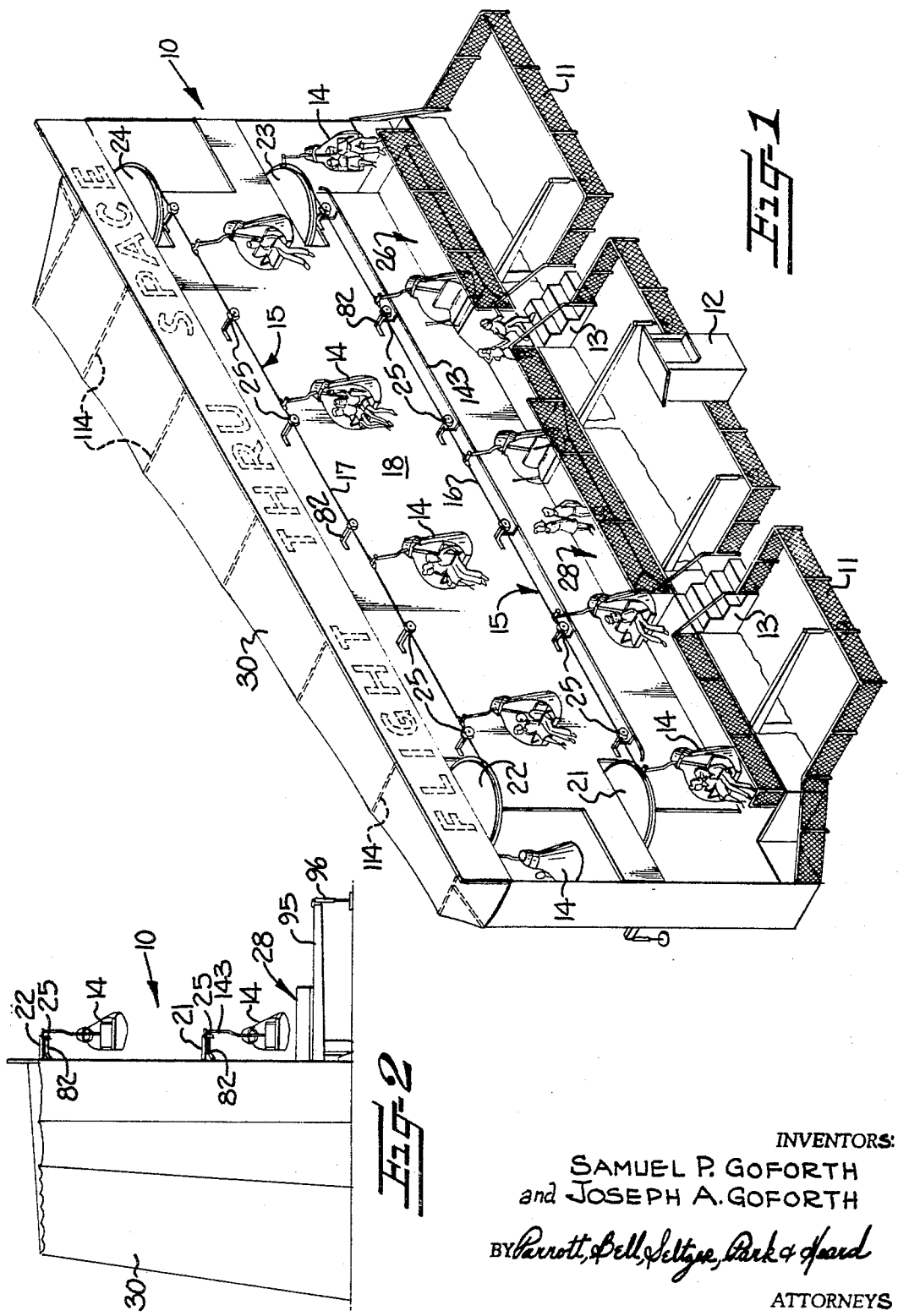
INVENTORS:
SAMUEL P. GOFORTH
and JOSEPH A. GOFORTH
ATTORNEYS

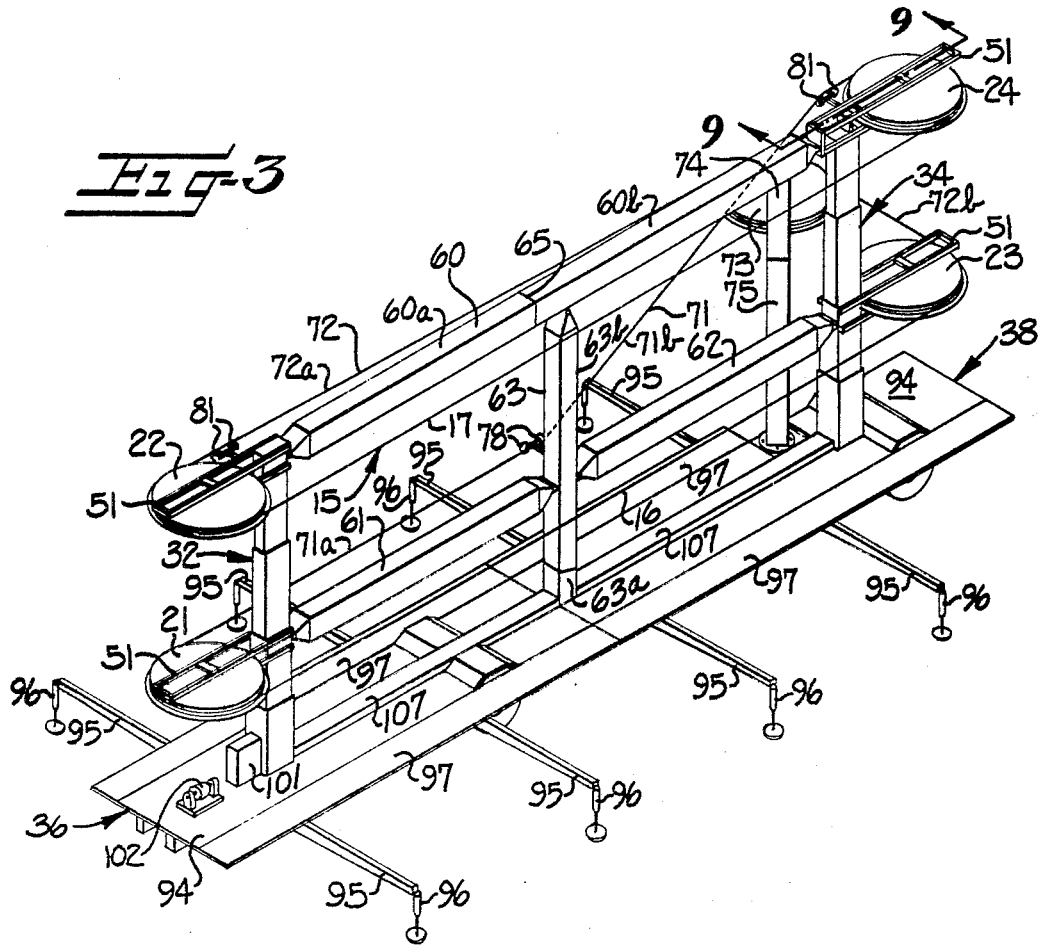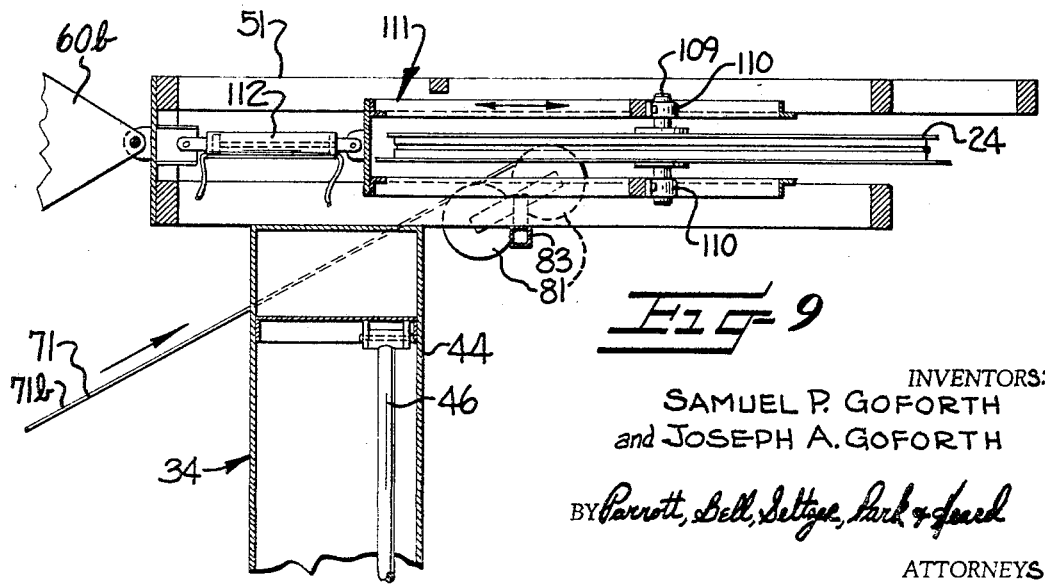

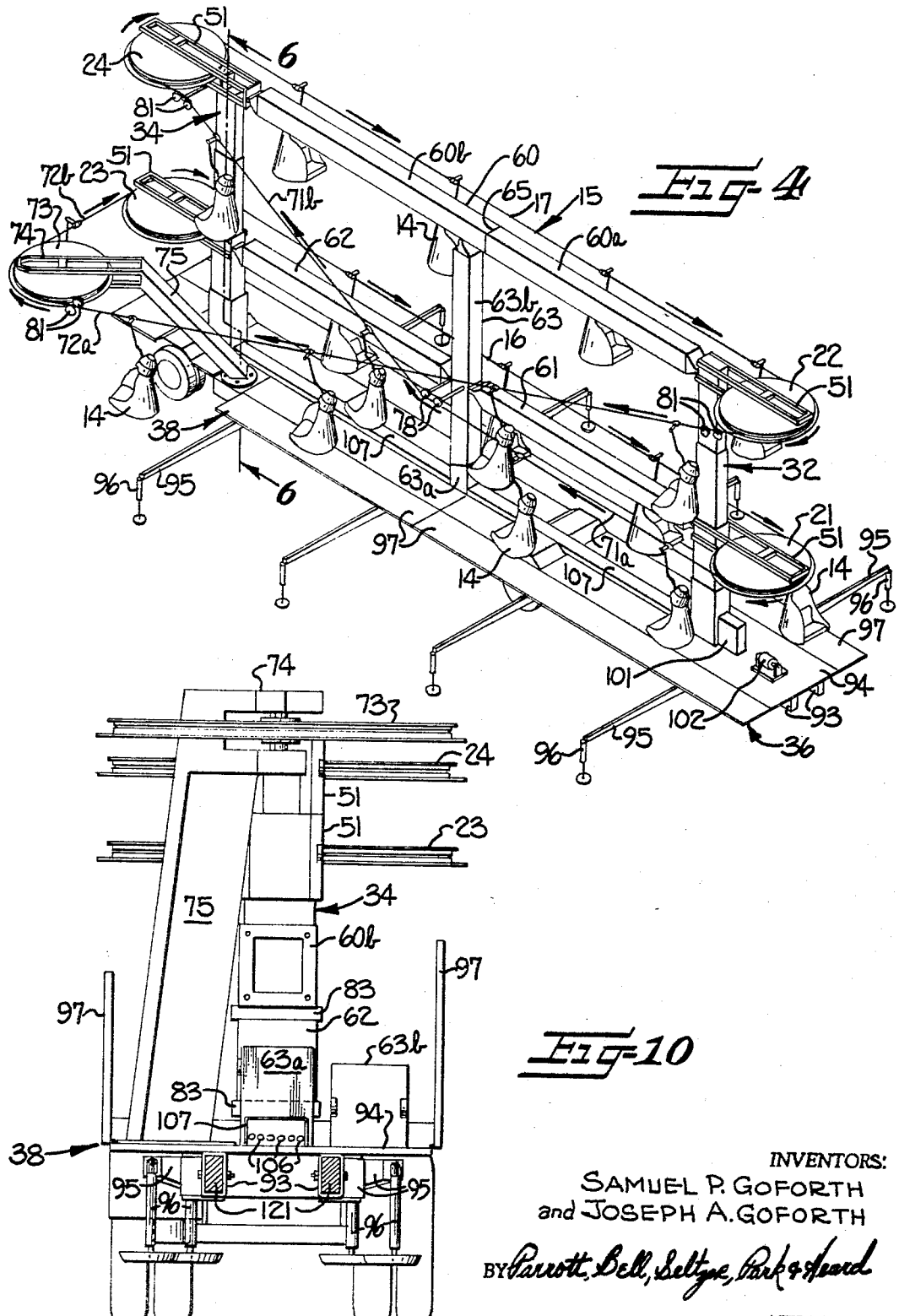

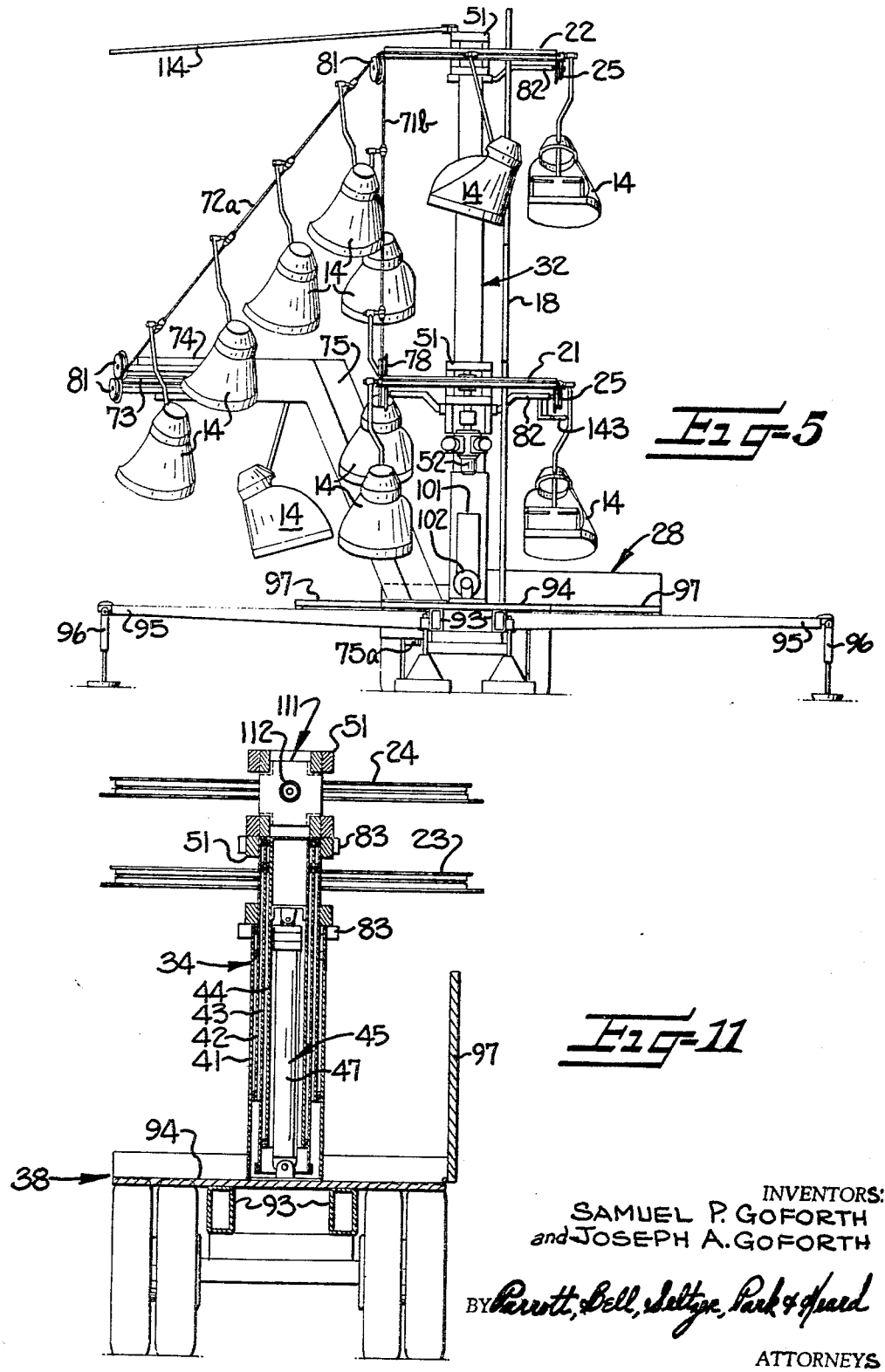

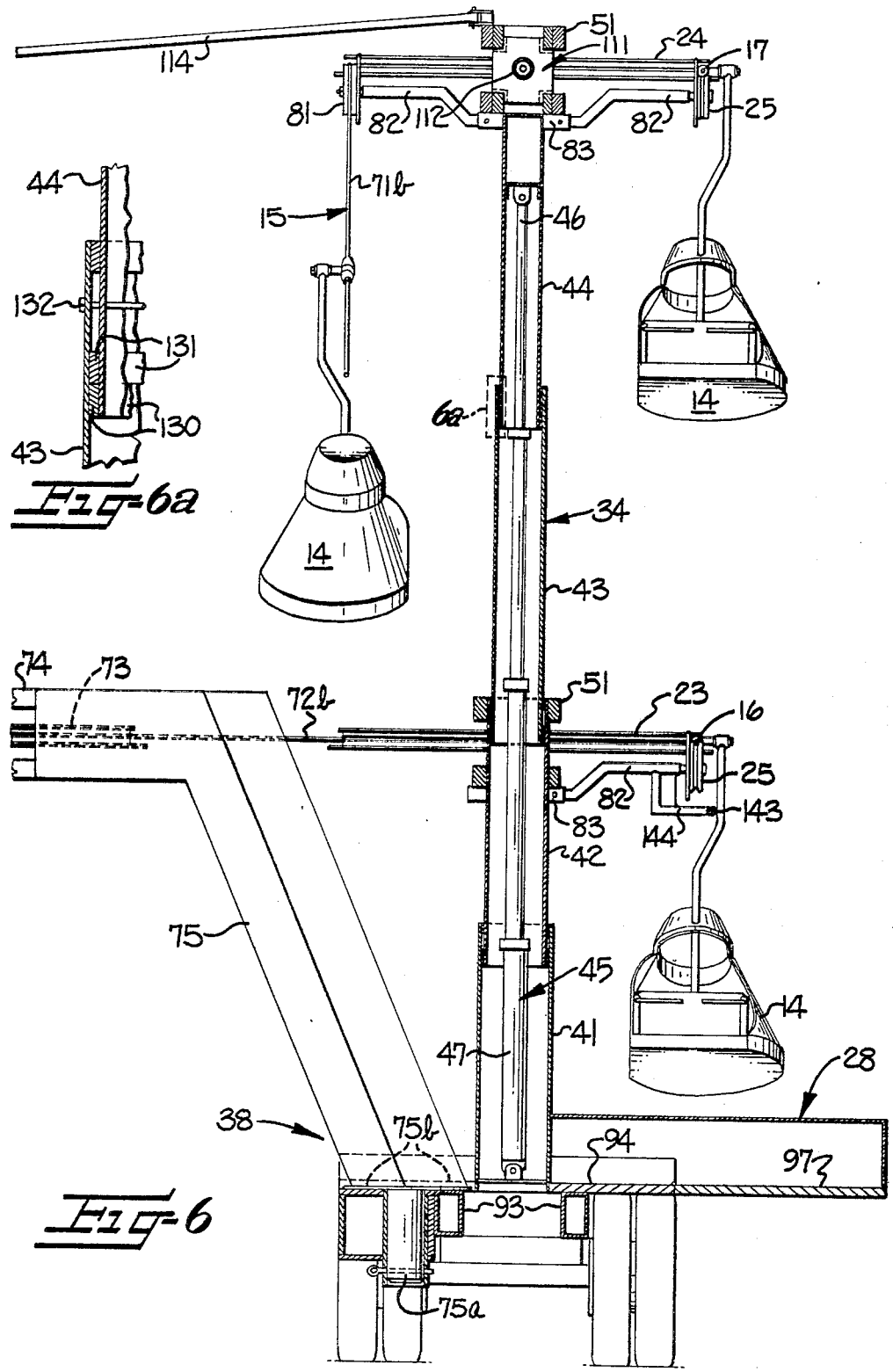

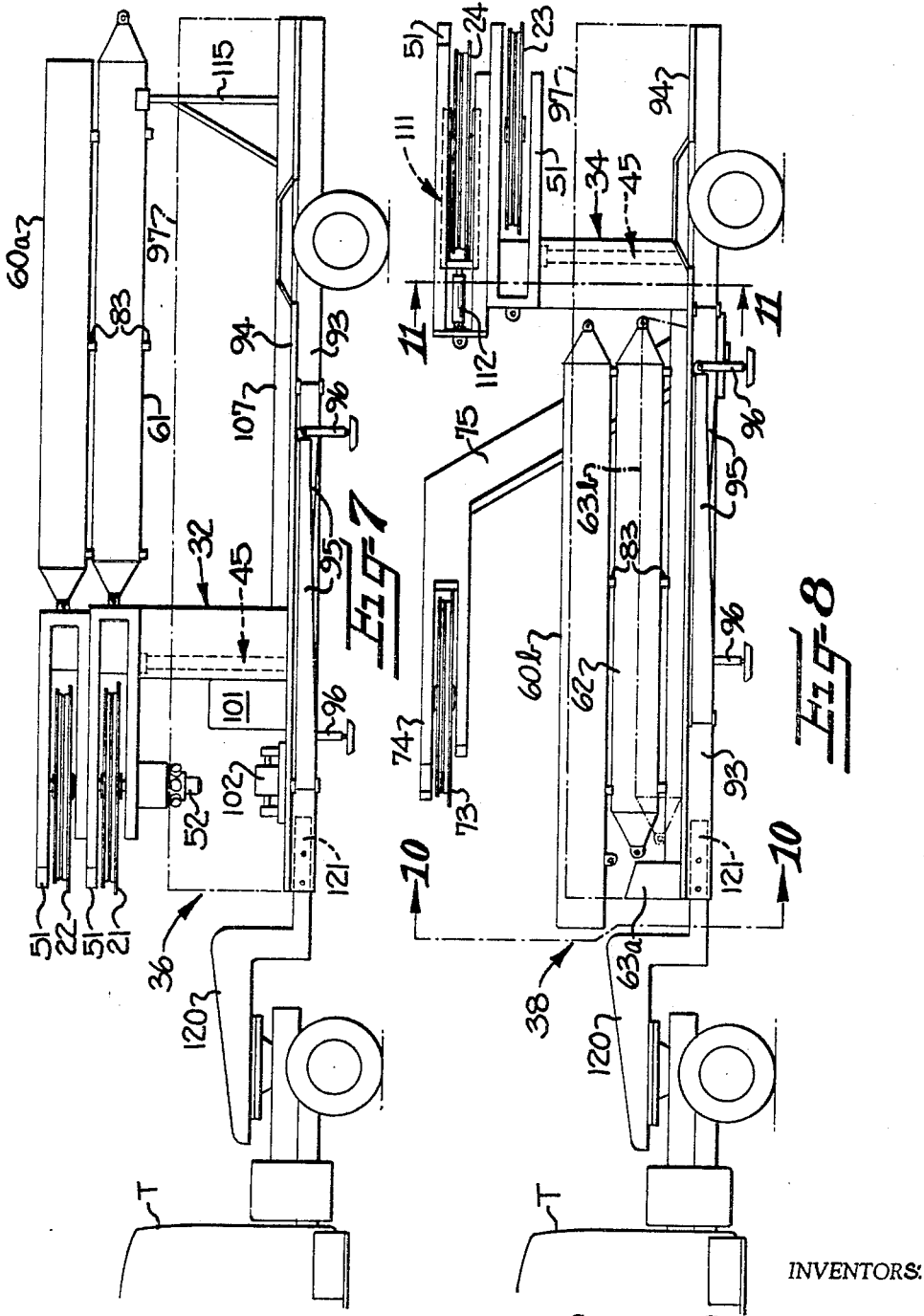

United States Patent Office 3,484,104
Patented Dec. 16, 1969

3,484,104
AMUSEMENT RIDE DEVICE
Samuel P. Goforth and Joseph A. Goforth, Shelby, N.C.,
assignors to Goforth Brothers, Inc., Shelby, N.C., a
corporation of North Carolina
Filed July 25, 1967, Ser. No. 655,795
Int. Cl. A63g 1/08, 1/36
U.S. Cl. 272—29                                                     9 Claims

ABSTRACT OF THE DISCLOSURE

A portable amusement ride device comprising an endless conveyor cable having a plurality of passenger chairs fixed in spaced relation thereon, and being supported for longitudinal movement in vertically-spaced, horizontal flights between extendable and retractable support columns, which columns are mounted on juxtaposed mobile trailers to permit compact transportation of the device between locations of use.

---

This invention relates to an amusement ride device, and more particularly to an endless cable, moving chair type amusement ride device for use in traveling carnivals, amusement parks, and the like to provide entertainment for persons riding thereon.

It is an object of the present invention to provide an amusement ride device having novel and unusual entertainment features for passengers and comprising an endless cable conveyor having a plurality of passenger chairs attached at spaced intervals therealong, wherein the chairs are moved over a predetermined course of travel having vertically-spaced, horizontally-extending flights therein.

It is a further object to provide a portable amusement ride device of the type described which may be easily assembled and disassembled, and may be readily transported in a highly compact condition for relocation and use in traveling carnivals and the like.

It is a more specific object to provide a portable amusement ride device comprising a pair of extendable and retractable spaced upright support columns interconnected by auxiliary support members and mounted on a pair of mobile bases, which support members and columns may be collapsed and transported on the mobile bases over conventional roadways.

Some of the objects of the invention having been stated, other objects will appear as the description proceeds, when taken in connection with the accompanying drawings, in which:

FIGURE 1 is a front perspective view of the amusement ride device of the present invention;

FIGURE 2 is a left side elevation view of the device as seen in FIGURE 1;

FIGURE 3 is a front perspective view of the amusement ride device, with the enclosure members and passenger chairs of the device removed to better show the major support members of the device;

FIGURE 4 is a rear perspective view of the support members of the device as seen in FIGURE 3, with the passenger chairs attached to the conveyor cable of the device;

FIGURE 5 is a right side elevational view of the device as viewed in FIGURE 4;

FIGURE 6 is an enlarged partial sectional view of one of the support columns of the device taken generally along line 6—6 of FIGURE 4;

FIGURE 6a is an enlarged view of the end portions of the adjacent telescoping sections of one of the support columns, as seen in the enclosed rectangle 6a of FIGURE 6;

FIGURE 7 is an elevational view of a portion of the major support members of the device in disassembled and nested condition for transportation on one of the supporting trailers of the device;

FIGURE 8 is an elevational view of the remaining major support members of the device in disassembled and nested position for transportation on another of the supporting trailers;

FIGURE 9 is an enlarged fragmentary sectional view of one of the supporting turn wheels of the device taken generally along line 9—9 of FIGURE 3;

FIGURE 10 is a partial sectional view of the trailer and support members taken generally along line 10—10 of FIGURE 8; and FIGURE 11 is a sectional view of the trailer and support column of the device taken generally along line 11—11 of FIGURE 8.

Referring more specifically to the drawings, FIGURE 1 shows an overall view of the assembled portable amusement ride device 10 of the present invention, together with conventional fencing 11, admission both 12, and accommodation stairs 13 normally used in operation of such devices. As seen, the ride simulates a flight through space, with a plurality of passenger chairs 14 shaped generally in the form of space capsules fixed in spaced relation on an endless conveyor cable 15, portions 16, 17 of which are disposed in vertically-spaced, horizontal flights across the front of a vertical display wall 18. The wall 18 may be decorated with various indicia such as stars, planets, spaceships, and the like to further suggest the environment of outer space.

At the ends of the flights 16, 17, the cable is entrained about vertically-spaced, horizontally-disposed turn wheels 21–24, which cooperate with a plurality of rotatable sheaves 25 spaced along the lengths of the flights to support the cable for longitudinal movement. Located beneath the passenger chairs 14 in the lower flight 16 are passenger loading and unloading stations 26, 28, and ingress and egress of passengers from the chairs is normally effected at the stations during continuous movement of the cable.

The conveyor cable 15 and chairs 14 pass about the turn wheels 21–24 and through openings in the display wall 18 into an area behind the wall which is enclosed by an opaque material, such as canvas 30, which cooperates with the wall 18 to provide a darkened portion of the ride through which the passengers pass.

As best seen in FIGURE 3, which shows the major components of the ride with the display wall, canvas, and passenger chairs on the cable removed, the vertically-spaced pairs 21, 22 and 23, 24 of turn wheels defining the terminal points of the horizontal flights 16, 17 are supported, respectively, on upstanding support columns 32, 34 which are mounted on distal portions of a pair of juxtaposed bases 36, 38. As each of the columns is substantially identically constructed and operated, similar components of each are given the same numeral designation and will be discussed by reference to FIGURE 6, which shows the right-hand column 34 in FIGURE 3.

As seen, each column is composed of a plurality of hollow, box-shaped, telescoping sections 41–44 which are vertically movable between an extended position (FIGURE 6) and a nested or collapsed position (FIGURE 11) by an interiorly-located hydraulically-operated three-stage piston and cylinder mechanism 45, the upper stage 46 of which is secured to the upper section 44 of the column and the lower stage 47 of which is secured to the support base.

Each of the turn wheels 21–24 (FIGURE 3) is rotatably mounted in suitable bearings on a yoke-shaped frame 51 which is secured to and extends horizontally outwardly from the column so that the respective pairs of turn wheels 21, 22, and 23, 24 on the left and right-hand columns are in substantially vertical alignment. As best seen in FIGURE 6, the lower turn wheel frame 51 on each column is secured to the upper portion of the second telescoping section 42 and the upper turn wheel frame 51 is secured to the upper portion of the uppermost telescoping section 44 of the column. Three of the turn wheels 22–24 are freely rotatable in their frames 51 while the fourth, the lower turn wheel 21 on the left-hand column as seen in FIGURE 3 is positively driven by suitable means, such as a hydraulic motor 52 (FIGURE 5) to move the cable and chairs about the turn wheels and along the flights of the ride.

When the columns 32, 34 are in extended position, they are stabilized and supported by auxiliary support members, an upper horizontal member 60 which extends between and is removably secured by bolts (not shown) to the frame members 51 supporting the upper turn wheels 22, 24, and two lower horizontal members 61, 62 similarly attached at their outer ends to the lower turn wheel frame members 51. Supporting and stabilizing the upper horizontal member 60 and the adjacent inner ends of the two lower horizontal members 61, 62 is a vertical support member 63 which is centrally mounted on the base 38 between the columns 32, 34. These auxiliary support members may be suitably constructed of a frame work of metal bars, angle iron, or the like. The upper horizontal member 60 is composed of two sections 60a, 60b which are bolted together, as at 65, adjacent the vertical support member 63, and the vertical member 63 is composed of two sections—a lower section 63a secured to the base 38, and an upper section 63b removably secured thereto by suitable fastening means, such as bolts (not shown).

As seen in FIGURES 4 and 5, the enclosed or darkened portion of the amusement ride 10 which is located on the opposite side of the columns 32, 34 from the horizontal flights 16, 17 encloses ascending and descending flights 71, 72 of the cable and chairs. To insure clearance of the passenger chairs 14 during their movement along these flights, the lower portion of a first reach 72a of the descending flight 72 is outwardly-spaced from the lower column turn wheel 23 by an auxiliary turn wheel 73 which is rotatably mounted in a yoke frame 74 of a boom 75. The auxiliary turn wheel 73 is horizontally aligned with the lower column-mounted turn wheel 23 and defines therewith a final horizontal reach 72b for the descending flight. The ascending flight 71 includes a first horizontal reach 71a which extends from the lower turn wheel 21 to a point adjacent the vertical support member 63, where a pair of rotatable sheaves 78 engage the upper surface of the cable 15 to define the beginning of an upwardly-extending reach 71b. Thus it can be seen that by maintaining the first reach 71a of the ascending flight 71 well below the first portion of the first reach 72a of the descending flight, and by maintaining the latter portion of the first reach of the descending flight horizontally outwardly from the upwardly-extending reach 71b of the ascending flight, the flights 71, 72 are sufficiently spaced from each other to permit free passage of the chairs thereover.

Located adjacent each of the turn wheels 22, 24, and 73 which define terminal points of the upwardly and downwardly extending reaches 71b, 72a are pairs of rotatable guide sheaves 81 which engage the cable 15 during the critical periods of its entry and exit from the peripheral surface of the turn wheels and thereby facilitate proper track of the cable on the turn wheels. The operation and construction of the turn wheels of the ride may be of the type described in our copending patent application Ser. No. 592,862, filed Nov. 8, 1966, and now Patent No. 3,391,650.

All of the rotatable sheaves 25, 78 and 81 supporting the cable along the flights are removably attached to the auxiliary support members by horizontally disposed support arms 82 (FIGURE 6) which are inserted into hollow brackets 83 mounted on the members.

As best seen in FIGURES 6 through 8, the juxtaposed bases 36, 38 which support the upright columns, boom, and vertical support member comprise portable trailers, each consisting of a wheel-mounted chassis 93 (FIGURE 6) and a substantially flat, horizontal floor 94 secured to the chassis. Pivotally mounted at spaced positions and at their inner ends along the sides of the chassis 93 are a plurality of outriggers 95, the outer ends of which are provided with ground-engaging leveling devices, or jacks 96. During operation of the amusement ride device, the outriggers 95 are swung outwardly from the sides of the trailer bases 36, 38, and the jacks 96 are vertically adjusted to positively engage the ground and further stabilize the ride.

Pivotally secured to opposite sides of the floor 94 of each trailer are extension plates 97 (FIGURES 6 and 11) which, during assembly and operation of the ride, extend horizontally outwardly to rest on the outriggers 95 (FIGURE 5) and provide a wider base and walkway for passengers and operators of the ride. During transportation of the amusement ride on the trailers, the plates 97 are pivoted to the vertical position shown in broken lines in FIGURES 10 and 11 to decrease the width of the trailers so that they may be transported over a conventional roadway.

The hydraulic system of the amusement ride device is controlled from a master control box 101 (FIGURES 4 and 7) located on the floor 94 of the trailer base 36 adjacent the base of the column 32. An electrically driven pump 102 mounted on the end of the trailer base 36 is utilized to supply hydraulic fluid from a reservoir (not shown) inside the box 101 to the various hydraulically operated components of the ride. Hydraulic transmission lines 106 (FIGURE 10) extend along the length of the floor of the trailers and are enclosed in a tunnel-shaped housing 107 (FIGURE 4). Although not shown, the transmission lines extend from the housing at suitably spaced locations along the same to supply fluid under pressure to the three-stage piston and cylinder mechanisms 45 in the columns, the hydraulic turn wheel drive motor 52, and each of the ground-engaging jacks 96 located on the outer ends of the outriggers 95, so that the various components may be operated and controlled from a single operator position during assembly and disassembly of the ride.

Hydraulic fluid is also supplied from the main hydraulic system to operate a tension-compensating device which maintains uniform tension on the endless cable 15 when the chairs 14 are occupied by varying numbers of passengers. As best seen in FIGURE 9, the shaft 109 of upper turn wheel 24 on the upright column 34 is rotatably mounted in journal bearings 110 on a small yoke member 111 which is horizontally slidable in the larger yoke frame 51 supporting the turn wheel. A hydraulically-operated pressure cylinder 112 connects the end of the yoke member 111 to the inner end of the yoke frame 51 and is controlled by a conventional sensing mechanism (not shown) to position the yoke member 111 horizontally, relative to the yoke frame, so as to maintain a constant tension on the endless cable 15 when varying weights are supported thereby, as when the passenger chairs 14 are partially or completely filled with passengers.

For portability, the display wall 18 of the amusement ride device may be conveniently formed of a plurality of panels which are suitably supported in assembled position on the bases and auxiliary support members. The canvas 30 which together with the display wall 18 forms the darkened portion of the ride is supported by a plurality of generally horizontally-extending arms 114 removably secured to the upper horizontal support member 60 (FIGURE 5 and 6). The wall panels, canvas, rotatable sheaves, endless cable, and passenger chairs are removed from the major support members of the device for compact storage thereof during transportation of the amusement ride to another site of use.

Assembly and dissembly of the amusement ride device may best be described by reference to FIGURES 7 and 8 which show the major support components of the device in a collapsed condition on the trailers 36, 38 for transportation. The trailer 36 shown in FIGURE 7 carries the lefthand column 32 with the sections 41–44 of the column in nested relation and the horizontal turn wheels 21, 22 in vertical juxtaposition. Horizontal support members 60a, 61 attached to the yoke frames 51 of the column 32 are secured in generally horizontal juxtaposed alignment by a metal brace 115 which is removably mounted upon the floor 94 at the rear of the trailer.

In like manner, the right-hand column 34 (FIGURE 8) is transported in nested condition on the rear portion of the trailer 38 with the horizontal support members 60b, 62 removed from their turn wheel yoke frames 51 and stacked on the floor of the trailer forward of the upright column. The upper section 63b of the vertical support member 63 is removed from the lower fixed section 63a and lies on the floor of the trailer adjacent the horizontal members. All of the support members may be further secured by a suitable flexible band (not shown) to hold them in place on the trailer during transportation of the ride. The outriggers 95, together with their ground engaging jacks 96, are pivoted inwardly under the floor 94 of the trailers and alongside the chassis 93 where they may be held by suitable means during transportation. Each trailer is transported by a tractor T which is attached to the front end of the trailer by goose-neck members 120, the ends 121 of which are removably secured to the trailers by suitable fastening means (not shown).

Contributing to the compactness and portability of the amusement ride device is its capability for relocation of the boom 75 supporting the auxiliary turn wheel 73 over the main body of the trailer 38. As seen in FIGURE 6, the base of the boom 75 has a cylindrical projection 75a which is frictionally received in a sleeve fitting 122 secured to the chassis 93 of the trailer 38 so that the boom can be pivotally swung from its outwardly-extending position (FIGURE 6) to a position overlying the floor of the trailer (FIGURE 10). The boom 75 may be secured in either position by retaining bolts (not shown) which engage mating apertures in a base plate 75b on the boom 75 and in the floor 94 of the trailer.

Assembly of the amusement ride device may be accomplished in the following manner. The trailer 38 containing the right-hand column is positioned by its tractor in a desired location of use. Support jacks, such as those shown at 124 (FIGURE 5) are placed under the forward end of the trailer 38 and the gooseneck member 120 connecting the trailer to the tractor T removed. The trailer 36 supporting the left-hand column 32 is then backed into position with the rear of the trailer 36 in juxtaposition to the front end of the trailer 38. Support jacks 124 are placed under the front end of trailer 36 and the gooseneck member 120 connecting the trailer to the tractor removed.

Hydraulic lines between the trailers are interconnected, the outriggers 95 swung outwardly from the sides of the trailers, and the ground-engaging jacks 96 hydraulically adjusted from the master control box 101 to stabilize and level the trailers. The side plates 97 on the trailers are then lowered to a horizontal position to widen the floor of the trailers. The two sections 60a, 60b of the upper horizontal support member 60 are bolted together and the right-hand end of the member connected to the upper turn wheel yoke frame 51 on the right-hand support column 34.

The hydraulic power supply is energized to simultaneously elevate the support columns 32, 34 a short vertical distance to permit the upper section 63b of the vertical support member 63 to be connected to the upper horizontal support member 60. As the hydraulic piston and cylinder mechanisms 45 in each column are vertically extended, the innermost telescoping column section 44 (FIGURE 11) is raised from the remaining nested sections until an external flange 130 (FIGURE 6a) on its lower end engages an internal flange 131 on the upper end portion of the next outermost section 43, simultaneously lifting it with the innermost section 44 during further vertical movement of the piston and cylinder mechanism 45. The upper and lower portions of the remaining column sections are similarly flanged to provide for sequential vertical movement of the sections to the fully extended positions of the columns. If desired, the sections of the columns may be locked in extended position by bolts 132 inserted in mating apertures in the ends of the sections (FIGURE 6a).

The upper section 63b of the vertical support member 63 is then aligned with the lower, fixed section 63a on the trailer 38 and secured thereto by suitable fastening means, such as bolts (not shown). The two lower horizontal support members 61, 62 are then attached to the lower turn wheel frame members 51 and the vertical column 63. To facilitate proper positioning of the auxiliary support members for attachment to each other and to the columns, suitable lifting devices, such as a chain fall or block and tackle arrangement (not shown), may be employed.

Next, the rotatable sheaves 25, 78 and 81 are attached to the support members and the boom 75 supporting the auxiliary turn wheel 73 swung outwardly from its overlying position on the trailer 38 to its normal outwardly-extending position of use. The endless cable 15 is then entrained about the various turn wheels and the passenger chairs 14 attached to the cable. The wall panels are assembled between the columns, and the canvas 30 is hung after attaching its support arms 114 to the upper horizontal support member 60.

In operation, the hydraulic motor 52 which drives the lower turn wheel 21 is energized to move the passenger chairs 14 and conveyor cable 15 continuously along the flights of the ride. Raised platform sections 141, 142 (FIGURE 1) may be provided at the loading and unloading stations 26, 28 to facilitate entrance and exit of the passengers from the chairs. As the passengers preferably enter and leave the chairs during continuous movement of the cable, a horizontal guide bar 143 (FIGURES 1 and 6) may be provided along the lower horizontal flight 16 to prevent undesired sideways swing of the passenger chairs 14 during passenger ingress and egress. The bar 143 is attached to the support arms 82 of the sheaves by suitable bracket arms 144 (FIGURE 6) which position the bar immediately below and outwardly from the sheaves so that the bar engages the supporting hanger bar 146 of each chair 14 to limit inwardly directed sideways movement of the chair, and thereby avoid possible injury to passengers and damage to the adjacent display board 18.

Upon entering the chairs, the passengers are transported about the lower turn wheel 21 and into the darkened portion of the ride, where the chairs move over the horizontal and upwardly-extending reaches of the ascending flight 71 to the upper turn wheel 24, where they exit from the darkened area and move along the upper horizontal flight 17 in front of the display wall. Upon leaving the horizontal flight, the chairs pass again into the darkened portion of the ride and over the descending flight 72, about the auxiliary turn wheel 73 to the lower turn wheel 23, where they again pass onto the lower horizontal flight 16 in front of the display wall.

Passengers may pass one or more times over the flights defining the course of the ride and may subsequently leave the moving chairs as the chairs pass over the exit station platform. If desired, the darkened portion of the ride may be provided with various visual and acoustical attractions, such as lights, horns, etc., so that the alternate passage of the passengers from the light to the dark areas of the ride closely simulates the actual conditions of orbital flight about the earth.

From the foregoing description, it can be seen that the amusement ride device of the present invention is constructed in such a manner that it may be quickly assembled and disassembled with minimum relocation of the major support components of the ride, and with the bases of the ride further serving to permit portability and compact transportation of the major support components over conventional roadways during relocation of the device.

In the drawings and specification there has been set forth a preferred embodiment of the invention and, although specific terms are employed, they are used in a generic and descriptive sense only and not for purposes of limitation, the scope of the invention being defined in the claims.

That which is claimed is:

1. An amusement ride device for transporting passengers over an endless course having generally horizontally-extending, vertically-spaced paths of travel therein, said device comprising a pair of juxtaposed mobile bases each being dimensioned to permit its transportation over a conventional roadway, a pair of columns mounted in spaced relation on distal portions of the respective juxtaposed bases for movement between a horizontally spaced, upright condition of support and a collapsed condition of portability, a pair of vertically spaced and aligned turn wheels carried by each of said columns for rotation about substantially vertical axes with respective upper and lower turn wheels on each column in substantial horizontal alignment, an endless cable entrained about said turn wheels and directed thereby in vertically-spaced substantially horizontal flights on one side of said columns, means disposed on the other side of said columns for directing said cable in horizontally spaced ascending and descending flights between said columns, a plurality of passenger chairs depending from said cable at spaced intervals therealong for movement thereby along said flights, and means for moving said cable and chairs about said turn wheels to transport passengers over said flights.

2. An amusement ride device as defined in claim 1 including elongate outrigger means mounted at spaced locations along sides of said bases and pivotably movable from positions generally parallel with the longitudinal axes of said bases to substantially perpendicular, outwardly-extending positions therefrom, and vertically adjustable ground-engaging means on the outer portion of each of said outrigger means cooperating therewith to stabilize said bases during operation of said amusement ride device.

3. An amusement ride device as defined in claim 2 including central control means for vertically adjusting said ground engaging means.

4. A portable amusement ride device for transporting passengers over an endless course having a plurality of vertically spaced paths of travel therein, said device comprising a pair of juxtaposed mobile bases each being dimensioned to permit its transportation over a conventional roadway, an endless cable having a plurality of spaced passenger chairs thereon, support means for suspending said endless cable and passenger chairs for longitudinal movement of said cable in an endless course of vertically spaced flights above said bases on one side of said support means and of horizontally spaced ascending and descending flights on the other side thereof, said support means being carried by and transportable on said bases and movable relative thereto between an extended position in which said endless cable and passenger cars are supported for movement and a retracted position in which said ride device is arranged for transport, and drive means for driving said endless cable and passenger cars along said endless course.

5. A portable amusement ride device as defined in claim 4 wherein said support means includes a pair of upright columns having telescopically extendable and retractable sections, said columns being located in spaced relation on distal portions of the respective juxtaposed bases for movement between an upright condition of support for said cable and passenger chairs and a telescopically collapsed position for transportation on said bases.

6. A portable amusement ride device as defined in claim 5 including fluid-actuated power means for telescopically extending and retracting said column sections during assembly and disassembly of said portable amusement ride device.

7. A portable amusement ride device as defined in claim 5 wherein said support means further includes a boom pivotally mounted on one of said bases adjacent the upright column thereon for movement between an outwardly extending support position on said base to an overlying position on said base for transportation thereon, a pair of vertically spaced turn wheels mounted on each of said columns and an additional turn wheel mounted on said boom member, said endless cable being entrained about all of said turn wheels for movement in said vertically spaced, generally horizontal flights and descending flight, and cable-engaging means supported on one of said bases between said upright columns cooperating with an upper turn wheel on one of said columns to define an upwardly extending reach of said ascending flight of said cable and passenger cars.

8. A portable amusement ride device as defined in claim 4 including passenger chair loading and unloading stations located on said bases in spaced relation along a lower flight above said bases.

9. A portable amusement ride device for transporting passengers over an endless course having generally horizontally-extending, vertically-spaced paths of travel therein, said device comprising a pair of juxtaposed mobile bases each being dimensioned to permit its transportation over a conventional roadway, a pair of extendable and retractable upright columns mounted in spaced relation on distal portions of the respective juxtaposed bases, a pair of vertically-spaced and aligned turn wheels carried by each of said columns for rotation about substantially vertical axes with respective upper and lower turn wheels on each column in substantially horizontal alignment, a pivotal boom mounted on one of said bases in outwardly extending relation therefrom and adjacent the upright column thereon, and an additional turn wheel mounted on an outer portion of said boom in spaced relation from the lower turn wheel on said adjacent column, auxiliary support members extending between said upright columns to strengthen and stabilize the same, an endless cable entrained about all of said turn wheels and extending in vertically-spaced, substantially horizontal flights between said columns on one side thereof opposite said additional turn wheel and in ascending and descending flights between said columns on the other side thereof adjacent said additional turn wheel, a plurality of passenger chairs depending from said cable at spaced intervals therealong for movement therewith along said flights, passenger chair loading and unloading stations on said bases located in spaced relation along the lower of said horizontal flights, and power means for moving said cable and chairs about said turn wheels to transport passengers over said endless course and for vertically raising and lowering said upright columns during assembly and disassembly of said amusement ride device.

References Cited

UNITED STATES PATENTS

| | | | |
|---|---|---|---|
| 2,265,711 | 12/1941 | Wooten | 272—31 X |
| 2,492,319 | 12/1949 | Rendine | 104—53 X |
| 3,222,061 | 12/1965 | Eyerly et al. | 272—29 |
| 3,377,959 | 4/1968 | Hawes | 104—173 X |

FOREIGN PATENTS 563,170  5/1957  Italy.

ANTON O. OECHSLE, Primary Examiner
A. W. KRAMER, Assistant Examiner

U.S. Cl. X.R.

104—173; 272—40